2,929,722

SOLID FLAVORING COMPOSITIONS CONTAINING SUCROSE ESTERS AND PROCESS OF MAKING THE SAME

Thomas H. Schultz, Lafayette, and William F. Talburt, Berkeley, Calif., assignors to the United States of America as represented by the Secretary of Agriculture No Drawing. Application December 22, 1958
Serial No. 782,334

4 Claims. (Cl. 99—140)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel flavoring compositions and methods for producing them. A general object of the invention concerns the preparation of solid flavoring compositions which serve as convenient sources of flavor and in which the volatile flavoring principles in the composition are effectively "locked-in," that is, the flavoring principles are completely surrounded by an edible, solid, impermeable, protective substance whereby the composition may be stored for long periods of time without loss of flavoring value through vaporization or deterioration of the flavoring principles. A specific object of the invention concerns the preparation of flavoring compositions having the above mentioned properties and wherein the compositions contain particular ingredients which cooperate to prevent loss of the volatile flavoring material from the compositions. Further objects and advantages of the invention will be evident from the description below, wherein parts and percentages are by weight unless otherwise specified.

It has been proposed heretofore to prepare solid flavoring compositions by emulsifying a volatile flavoring agent into a molten sugar base. The hot emulsion is either (a) cooled to solidify and harden it, then ground into suitable particles or (b) reduced to particles while still in a liquid to plastic condition and then cooled. The resulting solidified emulsion in particulate form is useful for imparting flavor to various foods and beverages, e.g., it may be added to dehydrated fruit juice products to restore flavor lost during dehydration.

It has now been observed that when the products so made are subjected to analysis, it is found that the amount of volatile flavoring agent therein is substantially less than the amount thereof originally incorporated into the sugar base. This is particularly true when the product is brought to its desired particle size by crushing or grinding after the hot emulsion has been hardened by cooling. In typical cases of this type it has been determined that the solid composition contains only 40 to 70% of the flavoring agent originally added to the sugar base. In general, the higher the proportion of flavoring agent added to the sugar base, the lower is the percentage retention of the flavoring agent. This factor causes serious difficulties where it is desired to produce a product of relatively high and uniform, predetermined flavor content. Moreover, this situation involves a serious loss of expensive and valuable flavoring agent.

When the product is prepared by procedures which involve subdivision into particles while the emulsion is still in a fluid to plastic state, it has likewise been found that serious losses of volatile flavoring agent occur. As in the situation noted above, the percentage loss increases as the proportion of flavoring agent added to the sugar base is increased.

The loss of flavoring agent is due to a vaporization of this material during the steps of preparing the solid composition. It is believed that the underlying reason for the vaporization is the inability of the prior processes to yield an emulsion of liquid sugar base and flavoring agent wherein the size of the globules of the latter is sufficiently small. The flavoring agent and the sugar base are, of course, entirely diverse in their properties; the former being an oily material, the latter being a water-soluble substance. Because of this fundamental incompatibiilty, the flavoring agent does not readily blend with the sugar base but exists as relatively large globules. When the flavoring agent-sugar base emulsion is subjected to the various steps required to produce the final product, for example, grinding or other size reduction step, a considerable proportion of these globules are exposed to the atmosphere and the flavoring agent vaporizes and is lost.

In accordance with the invention, the disadvantages described above are obviated by incorporating with the flavoring agent and the sugar base an ester of sucrose with a higher fatty acid. By addition of this ester, loss of flavoring agent is virtually eliminated. As a consequence, one may readily prepare solid compositions containing uniform and predetermined proportions of flavoring agent. Such products are of course highly desirable from a commercial standpoint as they lend themselves readily to direct use in food formulations without the necessity for pre-testing to ensure proper flavor level. A particular advantage of the invention is that it enables the preparation of compositions containing relatively high proportions of flavoring agent yet without substantial loss of the flavor component. The efficacy of the sucrose esters is believed to be due to the ability of these compounds to form a physical barrier around each particle of flavoring agent and thus prevent the particles from coalescing into large globules. The esters thus promote intimate blending of the flavoring agent and sugar base. The net result is that the flavoring agent is effectively protected from vaporization throughout the procedural steps of preparing the solid compositions and during the subsequent storage of the final product.

It is to be noted that the problem of preventing loss of flavoring agents in sugar base compositions differs in a number of respects from emulsification of oils in aqueous systems. Thus in the latter case many different types of surface active agents may be employed to promote or stabilize emulsions of oil and water. On the other hand, with the flavoring agent-sugar base emulsions, many conventional emulsifying agents, including the monoglycerides of higher fatty acids and the polyoxyethylene sorbitan higher fatty acid esters, are not effective to prevent loss of flavoring agent. It is thus evident that the effectiveness of the sucrose esters to prevent loss of flavoring agent from sugar base compositions involves a surprising result which could not have been predicted from known principles.

The sucrose esters employed in accordance with the invention are those of the class of sucrose partially esterified with higher fatty acids. By partially esterified is meant that not all the hydroxy groups of the sucrose are esterified, i.e., one or more hydroxy groups remain as such. It is generally preferred to employ the compounds wherein one or two hydroxy groups are esterified, that is, the mono or diesters. The acid moiety of the esters may be derived from any higher fatty acid, by which term is meant those fatty acids containing at least eight carbon atoms. Typical examples are caprylic acid, capric acid, lauric acid, myristic acid, palmitic acid, oleic acid, stearic acid, linoleic acid, linolenic acid, ricinoleic acid, dihydroxystearic acid, oleostearic acid, erucic acid, and the like. Illustrative examples of esters which may be employed in accordance with the invention are sucrose monolaurate, sucrose monomyristate, sucrose monopalmitate, sucrose monostearate, sucrose mono-oleate, sucrose dilaurate, sucrose dimyristate, sucrose dipalmitate, sucrose distearate, sucrose di-oleate, sucrose laurate-stearate, sucrose oleate-stearate, sucrose palmitate-stearate, and the like. The amount of sucrose ester to be employed in any particular case will vary depending on such factors as the characteristics of the selected sucrose ester, the nature of the flavoring agent and the sugar base, the relative proportions of flavoring agent and sugar base, etc. For example, a composition containing a relatively large proportion of flavoring agent will require more of the sucrose ester than one containing a lesser amount of flavoring agent. In general, the proportion of sucrose ester may range from about 0.1 to 5%, based on the dry weight of the sugar base.

Typically, preparation of solid flavoring compositions in accordance with the invention involves these steps: Preparation of a molten sugar base; incorporation of a selected volatile flavoring agent and sucrose ester into the base with the aid agitation to obtain an emulsion of the flavoring agent in the molten base; and forming the emulsion into solid masses of desired shape and/or size.

In preparing the molten sugar base, two or more sugars may be mixed and heated to liquefy them. However, to avoid any possibility of charring it is preferred to dissolve or disperse the sugars in water and then boil the solution until it reaches a solids content high enough so that on cooling to room temperature it will form a hard glassy mass. In many cases when a boiling point of about 150° C. is attained the solids content is at the proper level. However, this temperature is subject to considerable variation depending on the proportions of ingredients and in any particular case the proper boiling temperature can be ascertained by cooling a small sample of the hot mix and noting whether or not it forms a hard glassy mass. After having attained the proper solids content, the hot sugar base is preferably cooled somewhat so that when the flavoring agent is incorporated therein the amount of evaporation of the flavoring material will not be excessive. In any event the molten material may be cooled as much as desired with the proviso that it remain fluid enough to mix with the flavoring material and fluid enough to flow through the orifice or similar equipment, if such be used to form the solidified masses. Depending on the ingredients, the temperature of the molten base may be about from 80° to 150° C. when the flavoring agent is incorporated therein. Dextrin, for example, greatly increases the viscosity of the hot base. Thus where no dextrin or at most a small percentage thereof is used the base will remain fluid enough to incorporate the flavoring at lower temperatures than in instances where larger percentages of dextrin are employed. The sucrose ester may be incorporated into the molten sugar base prior to or simultaneously with the flavoring agent. In any event for best results the sucrose ester and flavoring agent are incorporated into the molten base without at the same time beating air into the mixture.

The hot emulsion of flavoring agent, sucrose ester, and sugar base produced as described above may then be treated in any of various ways to produce the solid composition. For example, the hot emulsion may be simply allowed to cool and solidify then crushed or ground into particles of suitable size. In the alternative, the emulsion may be reduced to particles while still liquid or at least plastic. This can be done in various ways as by forming the hot emulsion into droplets which are allowed to congeal in air or by extruding the hot emulsion in a continuous stream which is subdivided by pinching or cutting action while still in plastic state. The procedures disclosed in Patents Nos. 2,856,291 and 2,857,281 are admirably suited for accomplishing this reduction of the emulsion into particulate form.

It is evident from the foregoing that when the hot emulsion of flavoring agent, sucrose ester, and sugar base is cooled, a solid emulsion is formed containing the flavoring agent as minute globules uniformly dispersed throughout a continuous phase of solid, amorphous sugar base. The sucrose ester also constitutes part of the solid emulsion but it is not known what proportion of the ester is associated with the disperse phase (flavoring agent) or with the continuous phase (sugar base). It is believed, however, that the sucrose ester is less concentrated in either of these phases than it is at the interface between the phases.

The products of the invention are admirably suited for flavoring foods of all kinds. For example, they may be incorporated with products produced by dehydration of fruit juices to restore flavor lost in the various steps of dehydration. The resulting flavor-fortified dehydrated products when reconstituted with water form juices of good, natural flavor and aroma.

Any desired volatile flavoring agent may be incorporated with the sucrose ester and sugar base in accordance with the invention. Illustrative examples are orange oil, lemon oil, grapefruit oil, lime oil, clove oil, peppermint oil, bay oil, cedarwood oil, apple essence, pear essence, pineapple essence, grape essence, peach essence, apricot essence, strawberry essence, raspberry essence, cherry essence, prune essence, plum essence, cinnamon oil, oil of nutmeg, oil of sage, oil of bitter almonds, cassia oil, teaseed oil, coffee essence, and so forth. Mixtures of flavoring agents may of course be employed. In the case of fruit essences, such as those enumerated above, it is preferred to first purify them to remove water and low-molecular weight alcohols by the process described in the patent application of K. P. Dimick and B. Makower, Serial No. 368,016, filed July 14, 1953, now Patent No. 2,904,440. Instead of, or together with, natural flavoring principles, synthetic flavoring agents may be employed. Illustrative examples are the edible flavor- and aroma-bearing aldehydes, alcohols, esters, ketones, phenols, and lactones, for instance, methyl anthranilate, decanal, nonanal, undecanal, cinnamic aldehyde, geraniol, menthol, methyl salicylate, phenylethyl alcohol, diacetyl, citronellol, citral, and so forth. The proportion of flavoring agent to be incorporated in the sugar base may be varied depending on the flavor strength desired in the final product. Usually enough of the flavoring agent is added to furnish about from 5 to 25% thereof in the emulsion.

The sugar base used in preparing the flavoring compositions of the invention may be a sugar or a mixture of any two or more sugars. The base may thus be defined as consisting essentially of saccharides. Various sugars may be used as for example sucrose, dextrose, maltose, levulose, lactose, mannose, galactose, invert sugar, corn sugar, corn syrup solids, etc. A mixture of sugars if preferably employed to ensure the formation of an amorphous mass when the hot emulsion is cooled. An example of a sugar base is a mixture of sucrose with 10 to 50% of a different sugar such as dextrose, corn syrup, corn syrup solids, maltose, fructose, lactose, or invert sugar. Another example is a sugar base containing 100 parts sucrose and about 33 parts of invert sugar or corn syrup solids. For best results, it is preferred to employ as the sugar base a mixture containing the following ingredients, the proportions of which are given on a dry basis—

| Ingredient: | Proportion, percent of total weight |
|---|---|
| Sucrose | 15 to 40 |
| Lactose | 10 to 15 |
| Maltose | 15 to 40 |
| Dextrose | 10 to 50 |
| Dextrin | 0 to 15 |

The base containing these ingredients is preferred as it is especially resistant to crystallization. Thus the base will not crystallize in the preparative stages when the molten base is subjected to shearing stresses as encountered in the pump, mixer, extruder or other devices used in forming the composition. This is an especially noteworthy characteristic of the base as such stresses are notorious for their ability to induce crystallinity in various substrates. Moreover, the final solid product will retain its amorphous state even when exposed to moist air or similar influences which tend to promote crystallization. Also the base containing the above ingredients has superior characteristics, as regards melting temperature and viscosity, to facilitate incorporation of the flavoring agent and sucrose ester, to facilitate shaping of the hot melt as by extrusion, and to obtain rapid setting of the hot melt to yield hard, non-sticky, amorphous products. These advantages are further explained as follows: The base liquefies at temperatures which are low enough so that the flavoring agent and sucrose ester may be incorporated therein without decomposition of any of the components of the mixture. At the same time the base in the liquefied state exhibits a proper viscosity for shaping it by such means as extrusion through an orifice. In such event a stream of uniform cross section can be readily obtained. Moreover, the base exhibits a high coefficient of viscosity, meansing that the viscosity increases sharply with decreasing temperature. The advantage of this attribute is that when the hot emulsion is contacted with air or other cooling medium it rapidly increases in viscosity to such an extent as to form a hard, glassy, non-sticky, amorphous mass. The rapidity with which this solidification occurs facilitates preparation of the final product and avoids any possibility of particles of the final product from sticking to one another. The preparation of flavoring compositions using as the base the aforementioned mixtures of sucrose, latctose, maltose, dextrose, with or without added dextrin, are disclosed and claimed in the copending application of T. H. Schultz Ser. No. 719,458, filed March 5, 1958.

In preparing the sugar base described immediately above, it is generally preferred to employ corn syrup (or corn syrup solids) as the source of some of the ingredients particularly maltose, dextrose, and dextrin. Depending on the type of corn syrup used these ingredients may be supplied in the proper proportions so that the individual components need not be added as such. Thus for example maltose is preferably supplied as corn syrup of the high maltose type. This grade of corn syrup is to be differentiated from the common medium- or high-conversion corn syrups of commerce which are of the high-dextrose type containing a lesser proportion of maltose than dextrose. Use of the high-maltose syrup (or the solids derived therefrom) eliminates for using isolated maltose which is quite expensive. Where a corn syrup (or corn syrup solids) is used to supply some of the ingredients, a small proportion of higher sugars will be added via the corn syrup. These higher sugars are not detrimental and their presence may even be advantageous in the sugar base.

The invention is further demonstrated by the following illustrative examples. For comparative purposes, procedures not in accordance with the invention are included. Percentages of orange oil are given on a volume/weight basis, abbreviated v./w. A proportion of 8.6% v./w., for example, means 8.6 milliliters of orange oil per 100 grams total weight of product.

Example I

The ingredients listed below were mixed together and boiled until the temperature of the mixture increased to 150° C., thus to prepare a molten sugar base.

| Ingredient: | Parts |
|---|---|
| Sucrose | 60 |
| Lactose | 20 |
| Dextrose | 22 |
| Corn syrup | 60 |
| Water | 23 |

The corn syrup was a high-maltose type syrup containing 81% solids, these solids being composed of—

| | Percent |
|---|---|
| Dextrose | 21.5 |
| Maltose | 49.9 |
| Higher sugars | 6.7 |
| Dextrin | 21.9 |

The composition of the sugar base is given below on a dry weight basis and accounting for the several ingredients in the corn syrup—

| Ingredient: | Proportion, percent |
|---|---|
| Sucrose | 36 |
| Lactose | 14 |
| Maltose | 17 |
| Dextrose | 23 |
| Dextrin | 7.5 |
| Higher sugars | 2.5 |

Example II

A series of solid flavoring compositions were prepared using the sugar base prepared as described in Example I. The following procedures were used—

Run 1 (in accordance with the invention): A portion of the molten sugar base was stirred with sucrose dipalmitate (0.5% based on dry weight of the sugar base) and the mixture was cooled to 130–135° C. Then, while constantly stirring, orange oil was added over a period of about 6 minutes. The orange oil was added by pumping it into the sugar base through a tube dipping into the sugar base and terminating at a point just above the stirring impeller to avoid contact with the air. The amount of orange oil was that required to furnish 8.60% (v./w.) thereof based on the total weight of the product. After addition of the orange oil, the emulsion was stirred a minute more; then the emulsion was poured onto a stainless-steel sheet in a layer about ⅛ to ¼ inch thick. This mass was allowed to cool and solidify in a room having normal temperature and low humidity. The solidified material was then ground by passing it several times through a coffee mill. The ground product was then screened, the 10 to 20 mesh particles being retained as final product. This product was then held in a chamber under vacuum (0.02 mm. Hg) for 16 hours to remove the portion of the orange oil on the surface of the particles. This portion of the oil being on the surface is not stabilized or "locked-in," hence is best removed as it will deteriorate on storage of the product.

Run 2 (control): The process as described above in reference to run 1 was repeated with the sole exception that the sucrose dipalmitate was omitted.

Run 3 (not in accordance with the invention): The process as described above in reference to run 1 was repeated with the sole exception tha the sucrose dipalmitate was replaced by a commercial monoglyceride of fat-forming fatty acids. This substance contained 61–66% monoglycerides, most of the remainder being diglycerides. It was employed in proportion of 1%, based on the dry weight of the sugar base.

Run 4 (not in accordance with the invention): The process as described above in reference to run 1 was repeated with the sole exception that the sucrose dipalmitate was replaced by polyoxyethylene sorbitan monostearate, a commercial emulsifier being an oily liquid with viscosity 400–600 cp. at 25° C. This material was used in a proportion of 1%, based on the dry weight of the sugar base.

The products prepared as above described were then subjected to analysis to determine the actual content of orange oil therein. From these analyses and the original theoretical oil content (8.60% v./w.) the loss of orange oil in each case was calculated. The results obtained are tabulated below—

| Run | Agent added | Orange oil content of product, percent v./w. | Loss of orange oil, percent |
|-----|-------------|---------------------------------------------|------------------------------|
| 1 | sucrose dipalmitate | 7.85 | 9 |
| 2 | none | 4.42 | 51 |
| 3 | monoglyceride | 5.12 | 42 |
| 4 | polyoxyethylene sorbitan monostearate. | 6.03 | 31 |

It is evident from the above data that in run 1 wherein sucrose dipalmitate was employed, the loss of oil was relatively insignificant (9%). However, this result is in sharp contrast to the other runs (not in accordance with the invention) wherein considerable losses (31 to 51%) of oil took place.

Having thus described the invention, what is claimed is:

1. The process which comprises incorporating a volatile, liquid flavoring agent and a partial ester of sucrose with a higher fatty acid into a hot, molten sugar base, and cooling the resulting hot mix to form a solid flavoring composition.

2. The process of claim 1 wherein the said ester of sucrose is sucrose dipalmitate.

3. A solid emulsion containing a volatile, liquid flavoring agent and a partial ester of sucrose with a higher fatty acid, in an amorphous sugar base.

4. The product of claim 3 wherein the said ester of sucrose is sucrose dipalmitate.

References Cited in the file of this patent

UNITED STATES PATENTS

| | | |
|---|---|---|
| 2,223,558 | Epstein | Dec. 3, 1940 |
| 2,809,895 | Swisher | Oct. 15, 1957 |
| 2,856,291 | Schultz | Oct. 14, 1958 |
| 2,857,281 | Schultz et al. | Oct. 21, 1958 |